3,294,791
TETRAHYDRO-2,5-METHANO-1,2,5-BENZOTHIA-
DIAZEPINE 1,1-DIOXIDE
Peter H. L. Wei, Upper Darby, and Stanley C. Bell, Philadelphia, Pa., assignors to American Home Products Corporation, New York, N.Y., a corporation of Delaware
No Drawing. Filed Mar. 14, 1966, Ser. No. 533,775
10 Claims. (Cl. 260—243)

This invention relates to benzothiadiazepine compounds as well as to the novel method for their preparation. In particular, the present invention is concerned with tetrahydromethanobenzothiadiazepines having pharmacological activity.

The novel compounds which are included within the scope of the present invention are represented by the following formula:

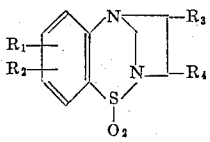

wherein $R_1$ and $R_2$ are both selected from the group consisting of hydrogen, lower alkyl, halogen and sulfamoyl; and $R_3$ and $R_4$ are both selected from the group consisting of hydrogen and lower alkyl. Examples of such compounds include: 7-chloro-2,3,4,5-tetrahydro-8-methyl-2,5-methano-1,2,5-benzothiadiazepine 1,1-dioxide; 8-chloro-2,3,4,5-tetrahydro-7-methyl-2,5-methano-1,2,5-benzothiadiazepine 1,1-dioxide; and 7-chloro-2,3,4,5-tetrahydro-8-sulfamoyl-2,5-methano-1,2,5-benzothiadiazepine 1,1-dioxide.

In accord with the process aspects of the present invention, the compounds of this invention may be prepared by the reaction of a tetrahydrobenzothiadiazepine 1,1-dioxide with formaldehyde. The reaction may be effected by heating a substantially equimolar mixture of the reactants in a reaction-inert organic solvent at a temperature from about 30° C. to about 100° C. for a period of from about one to about six hours. Preferably, this reaction is conducted in methanol with an excess of formaldehyde at steam bath temperatures for about one hour. After the reaction is complete, the product may be obtained by conventional means, such as, evaporation and recrystallization from a suitable solvent, e.g. an alkanol.

The tetrahydrobenzothiadiazepine 1,1-dioxides employed as starting materials in the above reaction are prepared by the procedures described in copending U.S. patent application, "1,2,5-Benzothiadiazepine 1,1-Dioxide," Serial Number 533,807, filed on March 19, 1966.

By reaction-inert solvent as employed herein is meant an organic solvent which dissolves the reactants but will not prevent or interfere with their interaction. Alkanols have been found to be satisfactory solvents, while other suitable solvents will be apparent to those skilled in the art of chemistry. These time and temperature ranges are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time.

The tetrahydromethanobenzothiadiazepine compounds of the present invention have been found to possess interesting pharmaceutical properties which render them useful as synthetic medicinals. More particularly, these compounds, in standard pharmacological tests have exhibited depressant, analgesic and anticonvulsant activities.

When the compounds of this invention are employed as depressants, analgesics and anticonvulsants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 200 mg. per day, although as aforementioned variations will occur. However, a dosage level that is in the range of from about 30 mg. to about 100 mg. per day is most desirably employed in order to achieve effective results.

The following examples are given by way of illustration and are not to be construed as limitations of this invention, many variations of which are possible without departing from the scope and spirit thereof.

*Example I*

7 - chloro - 2,3,4,5 - tetrahydro-8-methyl-1,2,5-benzothiadiazepine 1,1-dioxide (3.5 g.) is dissolved in 150 ml. of methanol and 30 ml. of a 40% formaldehyde solution is added. After heating on a steam bath for one hour, the solvent is removed at reduced pressure and the residue recrystallized from ethanol to yield 7-chloro-2,3,4,5-tetrahydro - 8 - methyl-2,5-methano-1,2,5-benzothiadiazepine 1,1-dioxide, M.P. 158–160° C.

*Analysis.*—Calcd. for $C_{10}H_{11}ClN_2O_2S$: C, 46.35; H, 4.28; Cl, 13.73; N, 10.83; S, 12.38. Found: C, 46.20; H, 4.21; Cl, 13.75; N, 10.59; S, 11.80.

Similarly, 7,8 - dichloro-2,3,4,5-tetrahydro-1,2,5-benzothiadiazepine 1,1-dioxide is reacted with a 10% formaldehyde solution at 50° C. for five hours to yield 7,8-dichloro-2,3,4,5 - tetrahydro - 2,5 - methano-1,2,5-benzothiadiazepine 1,1-dioxide.

*Example II*

8-chloro - 2,3,4,5 - tetrahydro-7-methyl - 1,2,5 - benzothiadiazepine 1,1-dioxide (3.50 g.) is dissolved in 150 ml. of methanol and 25 ml. of a 40% formaldehyde solution is added thereto. After heating on a steam bath for one hour, the solvent is removed under vacuum and the residue recrystallized from ethanol to yield 8-chloro-2,3,4,5-tetrahydro-7-methyl - 2,5 - methano-1,2,5-benzothiadiazepine 1,1-dioxide, M.P. 184–186° C.

*Analysis.*—Calcd. for $C_{10}H_{11}ClN_2O_2S$: C, 46.35; H, 4.28; Cl, 13.73; N, 10.83; S, 12.38. Found: C, 46.50; H, 4.38; Cl, 13.80; N, 11.04; S, 11.80.

*Example III*

Employing the procedure of the prior examples and utilizing the following reactants, the hereinafter listed products are obtained:

| Reactants | Products |
|---|---|
| 7-chloro-2,3,4,5-tetrahydro-8-sulfamoyl-1,2,5-benzothiadiazepine 1,1-dioxide and formaldehyde. | 7-chloro-2,3,4,5-tetrahydro-8-sulfamoyl-2,5-methano-1,2,5-benzothiadiazepine 1,1-dioxide. |
| 7-chloro-2,3,4,5-tetrahydro-3,8-dimethyl-1,2,5-benzothiadiazepine 1,1-dioxide and formaldehyde. | 7-chloro-2,3,4,5-tetrahydro-3,8-dimethyl-2,5-methano-1,2,5-benzothiadiazepine 1,1-dioxide. |
| 7-chloro-2,3,4,5-tetrahydro-4,8-dimethyl-1,2,5-benzothiadiazepine 1,1-dioxide and formaldehyde. | 7-chloro-2,3,4,5-tetrahydro-4,8-dimethyl-2,5-methano-1,2,5-benzothiadiazepine 1,1-dioxide. |
| 8-bromo-4-ethyl-2,3,4,5-tetrahydro-1,2,5-benzothiadiazepine 1,1-dioxide and formaldehyde. | 8-bromo-4-ethyl-2,3,4,5-tetrahydro-2,5-methano-1,2,5-benzothiadiazepine 1,1-dioxide. |
| 3-ethyl-2,3,4,5-tetrahydro-7-iodo-1,2,5-benzothiadiazepine 1,1-dioxide and formaldehyde. | 3-ethyl-2,3,4,5-tetrahydro-7-iodo-2,5-methano-1,2,5-benzothiadiazepine 1,1-dioxide. |
| 2,3,4,5-tetrahydro-1,2,5-benzothiadiazepine 1,1-dioxide and formaldehyde. | 2,3,4,5-tetrahydro-2,5-methano-1,2,5-benzothiadiazepine 1,1-dioxide. |

*Example IV*

3 - butyl - 2,3,4,5 - tetrahydro-1,2,5-benzothiadiazepine 1,1-dioxide (7.0 g.) is dissolved in 300 ml. of ethanol and 25 ml. of a 20% formaldehyde solution is added thereto. After heating to 80° C. for one and a half hours, the solvent is removed by evaporation and the residue recrystallized from methanol to yield 3-butyl-2,3,4,5-tetrahydro-2,5-methano-1,2,5-benzothiadiazepine 1,1-dioxide.

Similarly, 2,3,4,5-tetrahydro-4-propyl-2,5-methano-1,2,5-benzothiadiazepine 1,1-dioxide; 2,3,4,5-tetrahydro-3,7,8-trimethyl-2,5-methano-1,2,5-benzothiadiazepine 1,1-dioxide and 7-ethyl-2,3,4,5-tetrahydro-2,5-methano-1,2,5-benzothiadiazepine 1,1-dioxide are prepared.

*Example V*

7,8 - diethyl - 2,3,4,5 - tetrahydro-1,2,5-benzothiadiazepine 1,1-dioxide is dissolved in ethanol and reacted with a 5% formaldehyde solution at 30° C. for about six hours by the procedure of Example IV to produce 7,8-diethyl-2,3,4,5 - tetrahydro-2,5-methano-1,2,5-benzothiadiazepine 1,1-dioxide.

Similarly, 6 - bromo - 2,3,4,5 - tetrahydro-1,2,5-benzothiadiazepine 1,1-dioxide is reacted with a 50% formaldehyde solution at 65° C. for four hours to yield 6-bromo-2,3,4,5 - tetrahydro-2,5-methano-1,2,5-benzothiadiazepine.

What is claimed is:

1. A compound selected from the group consisting of those having the formula:

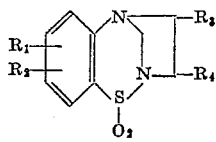

wherein $R_1$ and $R_2$ are both selected from the group consisting of hydrogen, lower alkyl, halogen and sulfamoyl; and $R_3$ and $R_4$ are both selected from the group consisting of hydrogen and lower alkyl.

2. A compound as claimed in claim 1 which is: 7-chloro-2,3,4,5-tetrahydro-8-methyl - 2,5 - methano-1,2,5-benzothiadiazepine 1,1-dioxide.

3. A compound as claimed in claim 1 which is: 8-chloro-2,3,4,5-tetrahydro-7-methyl - 2,5 - methano-1,2,5-benzothiadiazepine 1,1-dioxide.

4. A compound as claimed in claim 1 which is 7-chloro-2,3,4,5-tetrahydro-8-sulfamoyl - 2,5 - methano - 1,2,5-benzothiadiazepine 1,1-dioxide.

5. A compound as claimed in claim 1 which is: 7-chloro-2,3,4,5-tetrahydro - 3,8 - dimethyl - 2,5 - methano-1,2,5-benzothiadiazepine 1,1-dioxide.

6. A compound as claimed in claim 1 which is: 7-chloro-2,3,4,5-tetrahydro - 4,8 - dimethyl - 2,5 - methano-1,2,5-benzothiadiazepine 1,1-dioxide.

7. A compound as claimed in claim 1 which is: 2,3,4,5-tetrahydro-2,5-methano-1,2,5-benzothiadiazepine 1,1-dioxide.

8. A compound as claimed in claim 1 which is: 7,8-diethyl - 2,3,4,5 - tetrahydro - 2,5 - methano-1,2,5-benzothiadiazepine 1,1-dioxide.

9. A process for the production of a compound of the formula:

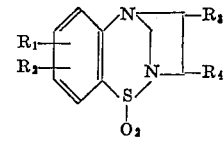

wherein $R_1$ and $R_2$ are both selected from the group consisting of hydrogen, lower alkyl, halogen and sulfamoyl; and $R_3$ and $R_4$ are both selected from the group consisting of hydrogen and lower alkyl, which comprises contacting a compound selected from the group consisting of those having the formula:

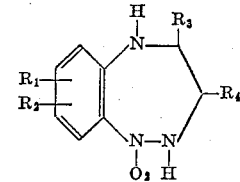

wherein $R_1$, $R_2$, $R_3$ and $R_4$ are defined as above, with formaldehyde, in a reaction-inert organic solvent, at a temperature that is in the range from 30° C. to about 100° C. for a period of from about one to about six hours.

10. A process as claimed in claim 9 wherein the reaction-inert solvent is methanol.

No references cited.

NICHOLAS S. RIZZO, *Primary Examiner.*